United States Patent [19]
Landrio et al.

[11] Patent Number: 5,780,809
[45] Date of Patent: Jul. 14, 1998

[54] WATER RESISTANT WELDING ROD

[75] Inventors: Eugene Landrio, Johnstown, N.Y.; Frank R. Landrio, Simpsonville, N.C.

[73] Assignee: Metaltone USA, Inc., Johnstown, N.Y.

[21] Appl. No.: 613,973

[22] Filed: Mar. 11, 1996

Related U.S. Application Data

[63] Continuation of Ser. No. 495,111, Jun. 27, 1995, abandoned, which is a continuation of Ser. No. 277,152, Jul. 19, 1994, abandoned.

[51] Int. Cl.$^6$ .................................................. B23K 35/22
[52] U.S. Cl. ........................................................ 219/145.23
[58] Field of Search ........................ 219/145.22, 145.23, 219/72; 428/328; 524/441

[56] References Cited

U.S. PATENT DOCUMENTS

| | | | |
|---|---|---|---|
| 3,555,240 | 1/1971 | Gloor et al. | 219/145.23 |
| 3,620,830 | 11/1971 | Kramer | 219/145.23 |
| 4,544,600 | 10/1985 | Kern | 428/328 |
| 4,804,818 | 2/1989 | Andersen | 219/145.23 |
| 5,187,220 | 2/1993 | Richart et al. | 524/441 |
| 5,436,428 | 7/1995 | Findlan et al. | 219/145.23 |

OTHER PUBLICATIONS

Letters from Eutectict Castolin Institute (Feb. 1973) and from General Electric (Jul. 1971).

*Primary Examiner*—Clifford C. Shaw
*Attorney, Agent, or Firm*—Schmeiser, Olsen & Watts

[57] ABSTRACT

A welding rod with a water resistant coating (14), and a method of making the same, is disclosed. To the surface of the welding rod is applied one or more coatings (14) comprising a plurality of metallic flakes and an organic binding agent which adheres the coating (14) to the electrode covering (12) on surfaces of the welding rod (10) and imparts the water resistance. The coating may comprise a thermoset phenolic resin and metallic flakes with an average particle size between 12 and 25 microns.

14 Claims, 2 Drawing Sheets

WATER RESISTANT WELDING ROD

This is a Continuation of application Ser. No. 08/495,111 filed 27 Jun., 1995, which in turn is a continuation of application Ser. No. 08/277,152, filed Jul. 19, 1994, both now abandoned.

TECHNICAL FIELD

The present invention relates to welding rods, more particularly, the present invention relates to a water resistant welding rods and a method of making the same.

BACKGROUND OF THE INVENTION

A welding rod or electrode encompass any filler metal, in bare or rod form, used in gas welding and braze welding, and those arc welding processes wherein the welding rod or electrode do not furnish any or all of the filler metal. Thus, there exists a wide range of metals and alloys utilized in welding rods and electrodes. However, each of these metals or alloys exhibit different welding properties and, thus, in order to obtain superior welds it is necessary to select an electrode having the properties best suited for the chosen weld. Choosing the proper electrode for a particular weld ultimately depends upon numerous factors well known to those skilled in the art, examples being: the base metal to be welded, the welding process to be utilized, the required tensile strength of the weld, the welding position, as well as other various considerations.

In addition to the varying compositions of the metal within the electrode, the coatings found on the surface of the metal likewise vary in composition as well as in their welding properties. Thus, when considering which electrode to select for a chosen weld it is necessary to consider the properties of both the metal and its coating. Only by selecting the proper electrode can a welder consistently obtain a stable and high quality weld. In this regard, the majority of welding rods or electrodes sold today are marked with American Welding Society (AWS) classification numbers which provide important information regarding the properties and characteristics of the electrode's metallic core and its coating. These classification numbers are utilized by welders to help them select the appropriate electrode for any given weld.

Although the electrode coatings found on electrodes, often referred to as fluxes, generally do not become part of the weld, they are still often required when creating certain welds since they serve an important function in the welding process, examples being: a) releasing a neutral or reducing gas such as carbon monoxide or hydrogen to protect the molten metal from atmospheric oxygen and nitrogen, which when allowed to come into to contact with the molten metal form impurities that ultimately weaken the weld; b) acting as a cleansing and antioxidizing agent in the molten crater; c) forming a slag over the deposited metal which further protects the weld until the metal sufficiently cools to a point at which it is no longer affected by atmospheric contamination and also slows the cooling rate of the deposited metal thereby permitting a more ductile weld to form; d) helping to create a more stabilized arc and reduce splatter; and e) permitting better penetration and improve the x-ray quality of the weld. Thus, electrode coatings are an integral component of welding rods and essential in many welding processes to assure high quality welds.

Materials often found in such coatings include hydroxides, clays, cellulose sodium, cellulose potassium salts, titania sodium, titanium oxides, titania potassium, iron oxide, feldspars, mica steatite, calcium carbonate, magnesium carbonate, silicates, various alumina, iron powder and other materials well known in the art, with regard to the use of iron powder in electrode coverings, the addition of the iron powder changes the arc behavior and increases the amount of metal deposited.

The quality of a weld produced by any electrode, whether bare or shielded, is significantly affected by its exposure to moisture. Water destroys the effectiveness of most electrode coverings and causes certain metals to rust. This problem is made worse by the fact that many electrode coatings are hygroscopic. Electrode coatings containing iron powder likewise suffer damage from moisture since the iron powder does not act to provide water resistant characteristics and is added solely to improve the welding arc and deposition rate.

Thus, in order to reduce the destructive effects of moisture, it is known that electrodes may be stored in specially built drying ovens. Storing the electrodes at high temperatures allows them to be kept in a moisture free environment and drives off some water from the electrode coating. Due to the lack of any suitable and inexpensive alternative the welding industry almost exclusively relies upon the use of such drying ovens to deal with this problem. So prevalent is the use of drying ovens in the welding industry that the production of such ovens and related equipment has itself become a significant business. Drying ovens are being produced and offered today in enormous varieties, ranging from large ovens to special portable ovens specifically designed to be carried as standard equipment on a welding truck. Nevertheless, to a much lesser extent it is also common to place electrodes in special electrode dispensers having atmospheric seals in order to prevent moisture from coming in contact with and destroying the bare rods or electrode covering.

However, the maintenance and transportation of special electrode drying ovens or atmospherically sealed containers is expensive and often troublesome. The problems and expense associated with maintaining electrode drying ovens is greatest when welding is conducted on a site-by-site basis as it requires transportation of the electrode drying oven from site to site.

In addition to being susceptible to decay from moisture, electrode coatings are also readily damaged by physical abrasion or contaminated through contact with foreign surfaces. Thus, coated electrodes must be handled carefully in order to prevent contamination or cracking of the coating. In this regard it is known in the art that special electrode carriers may be used to minimize the chance of such damage experienced by electrode coverings.

Although water resistant electrodes are known, such rods have been primarily used in underwater applications. Underwater electrodes have utilized lacquers and varnishes in order to waterproof electrodes so as to allow use of the electrode underwater. However, these electrodes are seldom used in applications above water as the lacquers and/or varnishes produce heavy noxious fumes in the welding process. These heavy fumes make it difficult and unhealthy for a welder to breathe and often obscure the view of the weld in process. These noxious fumes are not as problematic in underwater welding as the welder must utilize underwater breathing apparatus and also the fumes are dispersed in the water and as air bubbles which float to the surface thereby minimizing the welder's exposure to the same.

Therefore, there exists a need for a more economical and efficient means for preventing moisture from destroying the effectiveness of electrodes and electrode coverings. There likewise exists a need for an efficient and economical method for protecting electrode coverings from physical damage and contamination. There likewise exists a need for a water resistant electrode that does not produce heavy or noxious fumes during welding processes capable for use above water.

SUMMARY OF THE INVENTION

These needs are met, and the problems of the prior art overcome, by the welding rod of the subject application. Briefly, the invention provides for a water resistant coating for welding rods comprising a plurality of metallic flakes and a binding agent which holds said metallic flakes in a position surrounding the welding rod, thereby making said rod substantially water resistant. The water-resistant coating may comprise a thermoset phenolic resin and over 30% metallic flakes having an average size between 12 and 25 microns.

The present invention may further include a water resistant welding rod comprising: a metallic core; a layer of flux surrounding a portion of said metallic core; and one or more layers of weld-compatible metallic flakes surrounding said flux wherein the welding rod is made substantially water resistant and less susceptible to abrasion damage or other physical contaminants. A phenolic resin may be used to maintain the metallic flakes in the one or more layers.

The invention also provides for a method of making a water resistant welding rod comprising the steps of:

providing a welding rod;

removing impurities from said welding rod;

applying a precursor, having a substantially homogeneous suspension of metallic flakes, upon said welding rod;

curing said precursor upon said welding rod wherein a water resistant coating is formed upon said welding rod.

The method may be further characterised whereby the aforesaid steps are repeated from 1–5 times and the precursor is cured by applying heat to the welding rod and precursor.

DETAILED DESCRIPTION

The present invention relates to an economical and durable weld-compatible coating for electrodes which acts to give the electrode water resistant characteristics and protect the flux or other coatings from abrasion damage or other physical contaminants. As can be seen in reference to FIG. 1 the invention comprises a metallic core 10, an electrode covering 12, and a weld-compatible water resistant coating 14.

The metallic core 10 may comprise any metal, alloy or metallic composition known in the art to be useful in welding. Examples of such metals and compositions include, but are not limited to, mild steel, cast iron, stainless steel, bronze welding alloys, aluminum, and nickel. The metallic core is preferably sized according to common welding standards, for example welding rods are commonly 14 inches in length and available in diameters ranging from 1/16–1/4 inches. However, the metallic core may be sized in any manner consistent with any one of the numerous welding techniques.

Figure 1:
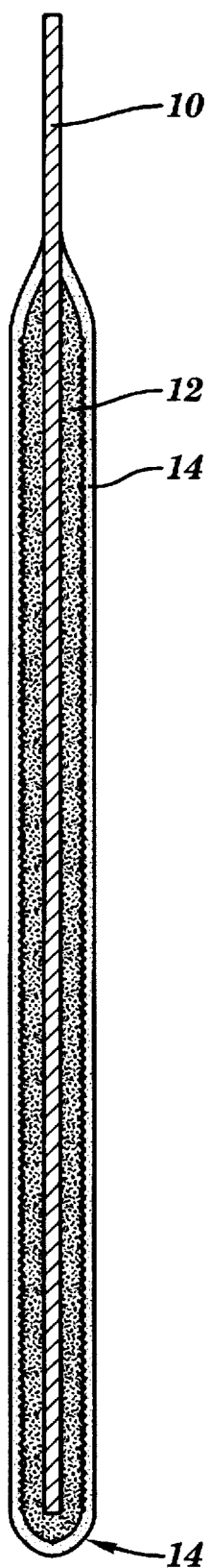
FIG. 1 is a length wise cross sectional view of a welding rod.

The metallic core 10 is substantially surrounded by a coating 12 as can be seen in reference to FIG. 1. As indicated above the specific characteristics of both the metallic core 10 and the electrode coating 12 will be identified by the AWS numbers which are typically stamped on the electrode. Selection of the appropriate electrode for a given weld is known to anyone skilled in the art of welding. The compositions of these coatings or fluxes, as well as the methods of applying the same to an electrode, are well known in the art. Coated electrodes are commercially available from a significant number of sources including the following companies: Uniweld Alloys of Ft. Lauderdale, Fla.; Lincoln of Cleveland, Ohio, and Eutectic Castolin of Flushing, N.Y.

The weld-compatible water resistant coating 14, surrounds those portions of the metallic core 10 and electrode coating 12 which are intended to be utilized in the welding process. Preferably the water resistant coating 14 completely surrounds the electrode coating 12 as shown in FIG. 1. It is likewise preferred that a plurality of water resistant coatings are layered onto the electrode. Multiple coatings will act to insure that the hygroscopic materials within the electrode coating 12 are fully protected from atmospheric moisture, other contaminants and physical abrasion.

Still referring to FIG. 1, adjacent either the bare electrode or the electrode covering 12 is a weld-compatible water resistant coating 14. This water resistant coating 14 substantially comprises a binder and metallic flakes. The water-resistant coating may comprise between 35–55% metallic flake. The metallic flakes may be composed of any of the numerous metals and alloys utilized in welding.

As certain electrodes are preferably selected for certain welds, the composition of metallic flakes within the water resistant coating 14 will vary with the intended use of the electrode. As indicated above, it is well known in the art which type of electrode is compatible for any given weld. It is likewise preferred to utilize a water resistant coating 14 having metallic flakes similarly compatible with the intended weld. For example, in order to create a weld upon an aluminum surface it is preferred that the metallic core and the metallic flakes both comprise aluminum. Utilization of either a copper electrode or an aluminum electrode with copper flakes in an aluminum weld will weaken the integrity of the weld. However, in producing a weld upon a stainless steel surface it is possible to utilize either a copper or stainless steel electrode and, thus, it is likewise possible to utilize a water resistant coating 14 having copper or stainless steel metal flakes. Similarly, nickel flakes may be utilized in the water-resistent coating or an electrode in connection with a cast iron weld. Thus, the metallic flakes utilized within the water resistant coating should be compatible with the welding process for which the coated electrode is intended. As indicated above, which type of metal may be utilized for any given weld is well known in the art.

With regard to the size of the metal flakes, they preferably fall within the range of 10 to 40 microns. An example of appropriate metal flakes are the polished 8620 Gold Bronze Flake manufactured by United States Bronze Powders Inc. Although these metal flakes will vary in size it is preferred that they are a relatively homogenous in size and shape. However, it is possible to utilize metallic flakes of varying average size within the water resistant coating 14 as discussed herein below. The flakes have substantially flat and uniform shape.

The binder may comprise a phenolic resin or any other weld-compatible binder. Thermoset phenolics are a preferred binder, an example of such phenolic is METCOSEAL APT sold by Metco Perkin Elmer of Westbury, N.Y. 11590-0201. An important aspect of suitable binders is that, during the welding process, as applied they do not produce excessive fumes, reducing agents or other compounds which are known to interfere with the welding process. The binder should also be capable of forming a durable layer which acts to hold the metal flakes in position around the coated electrode. It is also preferred that the binder is a thermoset resin cured at temperatures above 212° F. since this will cause any preexisting water to be driven off during the formation of the water-resistant coating.

A water resistant coating is selected which is compatible with the intended application and weld. The precursor is prepared by mixing the resin and the appropriate vehicle or solvent. The particular composition of the solvent will vary depending upon the particular binder selected, when using phenolic resins examples of suitable solvents often may include toluene, xylene, ethanol, isopropanol, N-butanol, N-butyl acetate, methyl N-amyl ketone and admixtures thereof. The metallic flakes are mixed within the resin solution in order to form a substantially homogeneous suspension.

In order to apply the water resistant coating to an electrode it is first necessary to select the desired electrode, that is the one having the properties best suited for the intended weld. Once the appropriate electrode is selected it is placed within a drying oven to eliminate substantially all traces of moisture. For example, baking the electrode in an oven at 375° F. for over 30 minutes is typically adequate to eliminate substantially all traces of moisture. However, aluminum rods generally require a longer pre-bake, from over 30 minutes to an hour, in order to adequately remove existing moisture. The electrodes remain in the oven and are allowed to cool to approximately 110° F. and are not removed from the oven until just prior to application of the water resistant coating.

Figure 2:
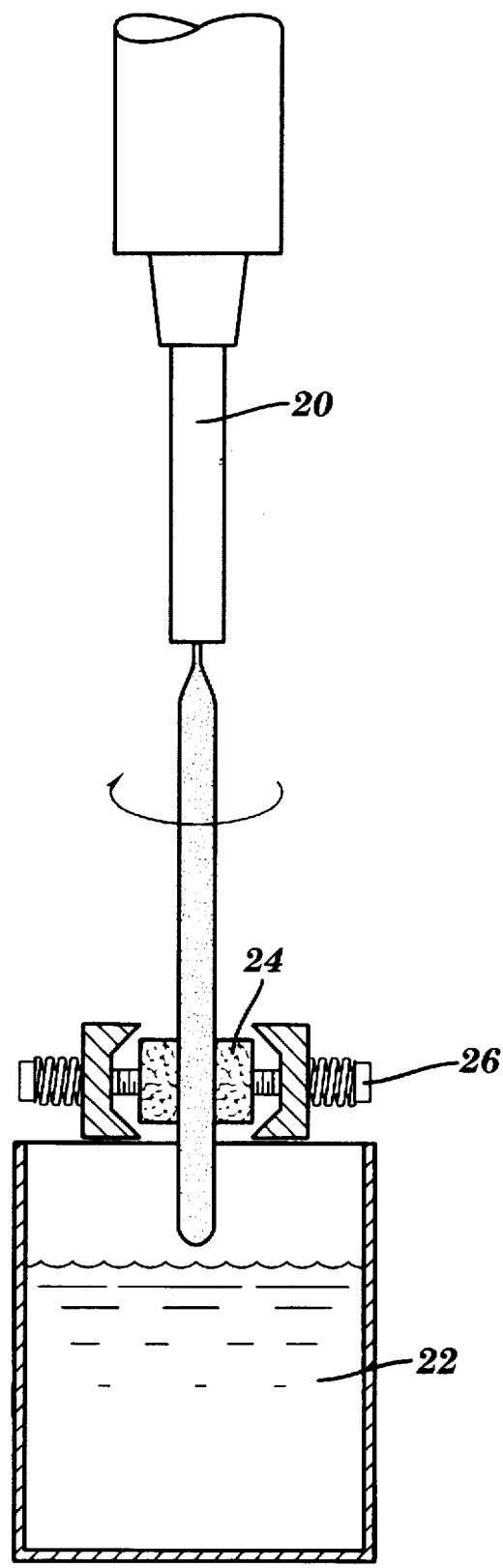
FIG. 2 is a frontal view of an apparatus for applying the protective coating.

After the initial baking, the rods are removed from the oven and the first layer of precursor to the water resistant coating is applied to the electrode. The precursor to the water resistant coating may be applied to the electrode by means of an applicator as shown in FIG. 2. The electrode is held by a rotatable shaft 20 and is dipped into a bath 22 comprised of the precursor. While the electrode is rotated it is removed from the bath and pulled between two felt pads 24 with the tension adjusted, such as by tension adjust screws 26, to remove excess precursor. Preferably the rod receives three such passes and is allowed to air dry for 5 minutes in between each pass. The water resistant coating may also be applied by hand by simply pouring the coating material onto a cloth and applying the coating to the electrode by hand. Whether the coating is applied via the apparatus in FIG. 2, by hand or another method commonly used to apply suspensions to a product, the coating is applied evenly over the electrode or electrode covering so as not to leave untreated areas, uneven portions or excess precursor that may cause dripping or running of the precursor.

The rods are then placed in an oven and baked at approximately 375° F. for 10 to 15 minutes. Baking the rods at this temperature for over 15 minutes may weaken the binder. It will be well known in the art that the baking times and temperatures may be varied as necessary to adequately set the particular phenolic resin or binder selected. The electrodes are then allowed to cool to approximately 110° F. whereupon additional layers of the water resistant coating may be applied as desired.

The number of coatings utilized will obviously determine the thickness of the water resistant coating 14. Preferably layers are applied until no electrode coating or flux remains exposed. Generally, this will require two or more layers although three layers is preferred. However, if great care is taken to thoroughly apply the water resistant coating one layer may sufficiently coat the electrode. The more coatings, the greater the water resistance of the electrode. Thus, the number of layers applied should reflect the desired durability and shelf life of the electrode. It has been found that using six or more coatings will not be detrimental to the weld. However, when over six layers are utilized on the electrode, the coating may start to produce a noticeable odor during the welding process.

The multiple layers of/water resistant coatings may either comprise the same coating material or a different coating material. For example, the first layer may comprise a coating utilizing larger metallic flakes and the second layer a coating utilizing smaller sized metallic flakes. However, in the preferred embodiment each coating utilizes metallic flakes having an average size of approximately 15 microns.

EXAMPLE 1

A stainless steel 312 coated electrode is pre-baked in an oven at 375° F. for 30 minutes. The electrode is allowed to cool to a temperature of 110° F. The water resistant coating precursor is made by mixing 2.0 grams of the METCOSEAL APT thermoset phenolic and 3.2 g of vehicle (40% Xylene/40% Methyl Isobutyl Ketone/10% Methyl Amyl Alcohol/10% 2-Ethoxy Ethyl Acetate) to which 2.1 grams of copper metal flakes (USB CU 8000) are added and then mixed thoroughly. Portions of the precursor are then poured onto a cloth and applied evenly to the electrode. The electrode is then allowed to air dry for 5 minutes and placed in an oven at 375° F. for 15 minutes. The electrode was allowed to cool to its previous temperature of 110° F.

A second layer of the water resistant coating may be applied by the methods stated hereinabove. However, in this example the second layer utilized a water resistant coating precursor comprising 1.9 grams of copper metal flakes having an average size of 15 microns (USB 8620), 2.0 grams of the phenolic and 2.9 grams of additional solvent. A water welding rod having superior water-resistent characteristics was thereby produced.

EXAMPLE 2

An aluminum coated electrode is placed in a drying oven for 1 hour at 375° F. and allowed to cool to 110° F. The electrode is removed from the oven and precursor (substantially homogenous layer of 2.1 g of USB Aluminum 807 flakes, 3.2 g Metcoseal AP and 2.0 g Metcoseal APT) is applied evenly over the electrode by hand with the aid of a clean dry cloth. The electrode is allowed to dry for 5 minutes and baked at 375° for 15 minutes. The electrode is then allowed to cool in the drying oven to just over 110° F. The electrode is removed and a second coating of precursor applied to the electrode by hand and then allowed to dry for 5 minutes and baked at 375° F. for 15 minutes. After cooling to 110° F. the electrode is again removed and a third coat of precursor applied by hand. The electrode is allowed to dry for 5 minutes and baked at 375° F. for 10 minutes. The electrode is allowed to cool to 110° F. in the drying oven and removed. A water-resistant aluminum electrode B was thereby produced.

EXAMPLE 3

One quart of a thermoset phenolic resin (Metcoseal APT) is mixed with one and a half (1 ½) quarts solvent (Metcoseal AP) in a cylindrical container. One quart of nickel metallic flake (ASB Nicu 8620 flake) is then added to and thoroughly mixed with the resin solution. A cast iron Ni-55 electrode is placed in a drying oven for 30 minutes at 375° F. and then allowed to cool in the oven to 110° F.

The electrode is then removed from the drying oven and the end free of flex is securely changed in to a rod holder. The rod holder is in turn attached to a rotable shaft. While the shaft is rotating the electrode it is substantially immersed into the precursor and removed. Excess precursor is removed from the electrode by spring loaded felt tip pads through which the electrode passes. The tension of the pads against the electrode is adjusted, by the tension adjust screws in connection with the springs, so that an even coating of precursor remains on the electrode substantially free of drips or runs. The electrode is allowed to dry for 5 minutes and then baked at 375° F. for 15 minutes. Upon cooling to 110° F. the electrode and its last layer of water-resistant coating is again treated with the precursor as indicated above, allowed to dry for 5 minutes and baked at 375° C. for 15 minutes. After cooling to 110° F. the electrode and its 2 layers of water-resistant coatings is again treated with the precursor, as above, allowed to dry for 5 minutes, and baked at 375° F. for 15 minutes. After cooling to 110° F. the water resistant electrode is removed from the drying oven where it may be stored in ambient atmosphere without requiring special drying stops prior to use.

While the invention has been particularly shown and described with reference to preferred embodiments thereof, it would be well be understood by those skilled in the art that other changes in form and details may be made therein without departing from the spirit and scope of the invention.

What is claimed is:

1. A water resistant composition of matter in combination with a welding rod comprising: a mixture of metallic flakes; and a binding agent, wherein the mixture of metallic flakes includes flakes that are primarily planar in shape.

2. A water resistant coating of claim 1 wherein said binding agent comprises a thermoset phenolic resin.

3. A water resistant coating of claim 1 comprising over 30% by weight metallic flakes.

4. A water resistant coating of claim 3 comprising over 45% by weight metallic flakes.

5. A water resistant welding rod of claim 4 wherein said metallic flakes have an average size between 12 and 25 microns.

6. A water resistant welding rod comprising:
    a metallic core;
    a layer of flux surrounding a substantial portion of said metallic core; and
    a first layer of weld-compatible metallic flakes surrounding said flux, wherein said metallic flakes are substantially planar in shape, and a phenolic resin wherein the welding rod is made substantially water resistant and less susceptible to abrasion damage or other physical contaminants.

7. A welding rod of claim 6 further comprising a second layer of weld-compatible metallic flakes surrounding said first layer of weld-compatible metallic flakes.

8. A welding rod of claim 7 wherein the average size of the metallic flakes within said second layer is smaller than the average size of the metallic flakes within said first layer.

9. A welding rod of claim 7 wherein said flakes have an average between 12 and 25 microns.

10. A water resistant welding rod comprising:
    a metallic core;
    a flux substantially surrounding said metallic core;
    a plurality of layers of compatible metallic flakes surrounding said flux, wherein said flakes are substantially planar in structure; and
    a phenolic resin, wherein the phenolic resin maintains said metallic flakes in said layers thereby making the welding rod substantially water resistant.

11. A water resistant welding rod of claim 10 wherein said binder comprises a thermoset phenolic resin.

12. A welding rod of claim 10 wherein said metallic core is copper and said metallic flakes are copper.

13. Metallic welding rod of claim 10 wherein said metallic core and said metallic flakes both comprise an aluminum based metal.

14. A welding rod of claim 10 wherein said metallic core comprises a stainless steel alloy and said metallic flakes comprises copper metal flakes.

* * * * *